United States Patent
Hardacker et al.

(10) Patent No.: US 8,264,548 B2
(45) Date of Patent: Sep. 11, 2012

(54) STEERING MIRROR FOR TV RECEIVING HIGH FREQUENCY WIRELESS VIDEO

(75) Inventors: Robert Hardacker, Escondido, CA (US); James R. Milne, Ramona, CA (US); Robert Allan Unger, El Cajon, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 565 days.

(21) Appl. No.: 12/489,721

(22) Filed: Jun. 23, 2009

(65) Prior Publication Data

US 2010/0325680 A1 Dec. 23, 2010

(51) Int. Cl.
*H04N 7/14* (2006.01)
*H04N 3/08* (2006.01)

(52) U.S. Cl. ............... 348/203; 348/14.02; 348/E3.009
(58) Field of Classification Search .............. 348/E5.128, 348/14.02, E3.009, 203
See application file for complete search history.

(56) References Cited

U.S. PATENT DOCUMENTS

| | | | | |
|---|---|---|---|---|
| 3,848,255 | A * | 11/1974 | Migdal ........................ | 343/761 |
| 4,293,861 | A * | 10/1981 | Winegard et al. ............. | 343/766 |
| 5,142,405 | A | 8/1992 | Hornbeck | |
| 7,016,711 | B2 * | 3/2006 | Kurakane ................... | 455/575.1 |
| 7,385,768 | B2 | 6/2008 | Wo et al. | |
| 7,482,273 | B1 | 1/2009 | Klein et al. | |
| 7,982,385 | B2 * | 7/2011 | Kimura et al. .............. | 313/503 |
| 8,054,232 | B2 * | 11/2011 | Chiang et al. ............... | 343/702 |
| 2002/0034958 | A1 | 3/2002 | Oberschmidt et al. | |
| 2002/0158689 | A1 * | 10/2002 | Harris et al. .................. | 330/129 |
| 2004/0145457 | A1 * | 7/2004 | Schofield et al. .......... | 340/425.5 |
| 2006/0065940 | A1 | 3/2006 | Kothari | |
| 2006/0066503 | A1 * | 3/2006 | Sampsell et al. ............ | 345/1.1 |
| 2007/0143806 | A1 * | 6/2007 | Pan .............................. | 725/111 |
| 2008/0136715 | A1 * | 6/2008 | Shtrom et al. .............. | 343/702 |
| 2009/0102800 | A1 * | 4/2009 | Keenan ........................ | 345/173 |
| 2009/0117859 | A1 | 5/2009 | Smith et al. | |
| 2009/0209216 | A1 * | 8/2009 | Candelore et al. ............ | 455/130 |
| 2009/0316056 | A1 * | 12/2009 | Rosencwaig et al. ......... | 348/836 |
| 2010/0156721 | A1 * | 6/2010 | Alamouti et al. ............ | 342/367 |
| 2011/0193770 | A1 * | 8/2011 | Gally et al. .................. | 345/108 |

FOREIGN PATENT DOCUMENTS

| | | |
|---|---|---|
| EP | 1162764 A1 * | 12/2001 |
| EP | 911906 | 3/2006 |
| JP | 2008124878 | 5/2008 |
| JP | 2008172488 | 7/2008 |
| KR | 20050052468 | 6/2005 |
| WO | WO 2007136292 A1 * | 11/2007 |
| WO | WO 2010073429 A1 * | 7/2010 |

OTHER PUBLICATIONS

Machine translation of JP 2006173945 A.*

(Continued)

*Primary Examiner* — Brandon Painter
*Assistant Examiner* — Elizabeth A Plummer
(74) *Attorney, Agent, or Firm* — John L. Rogitz

(57) ABSTRACT

In a home system in which a TV receives video from various sources over directional wireless links such as 60 GHz links, a mirror apparatus is provided that can be configured to physically steer a signal toward a receiver on the TV to optimize received signal strength. In this way, RF energy that otherwise would be radiated in non-productive directions away from the receiver is reflected toward the receiver.

12 Claims, 2 Drawing Sheets

OTHER PUBLICATIONS

"LG's 52-inch 52LG71 LCD TV boasts WiFi for HD streaming", http://www.engadget.com/2007/11/14/lgs-52-inch-52lg71-lcd-tv-boasts-wifi-for-hd-streaming/ , Nov. 14, 2007.

"Linux powers WiFi-equipped LCD-TV", http://www.linuxdevices.com/news/NS8228701721.html, Jan. 11, 2006.

* cited by examiner

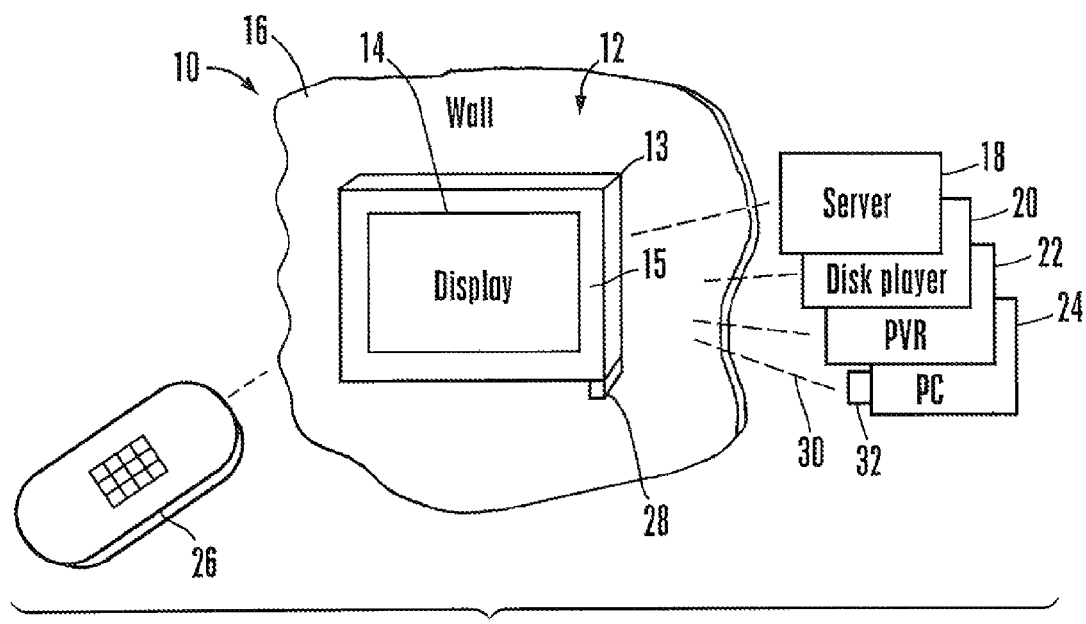
FIG. 1
FIG. 2
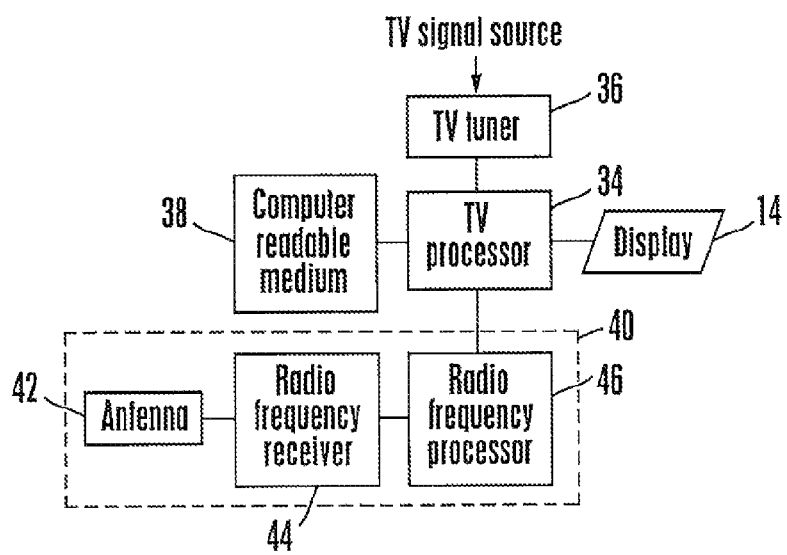

STEERING MIRROR FOR TV RECEIVING HIGH FREQUENCY WIRELESS VIDEO

FIELD OF THE INVENTION

The present application relates generally to steering mirrors for TVs that receive high frequency wireless video over, e.g., 60 GHz short-range wireless links in a home network.

BACKGROUND OF THE INVENTION

Home networks are provided in which information including multimedia is shared among networked components. For example, a TV might access a disk player or central server to play multimedia programming stored on disk or at the server. The TV might also access a hard disk drive to play recorded TV programming, display digital photographs, etc.

TVs also evolve, and presently relatively large flat panel display TVs can be mounted on walls as beautiful pieces of art work in which unsightly wires (network cables, video cables, etc.) are removed from view. This is often accomplished using wireless technology, wherein TVs wirelessly receive multimedia information from other components in the network.

As understood herein, relatively large wireless bandwidth is required to transfer multimedia information in a home network. For instance, compressed high definition (HD) video requires between twenty and fifty megabits per second of bandwidth.

As also understood herein, 60 GHz wireless communication principles may be used to wirelessly transmit video signals. Present principles understand that 60 GHz communication is directional, meaning that the chassis of the TV might block the radio waves or shadow the receiver antenna if placed behind the TV, wasting the transmitted radiofrequency (RF) energy.

SUMMARY OF THE INVENTION

RF energy on a wireless home network link is reflected toward an RF antenna on a TV by one or more mirrors. The mirrors may be mounted on the TV chassis and may be steerable to reflect the RF energy toward the RF antenna on the TV. Feedback may be used to position the mirrors, e.g., the mirrors may be steered by a processor until received signal-to-noise ratio (SNR) is optimized at the RF antenna on the TV. Also, the mirrors can be dynamically positioned such that obstructions or secondary reflections that occur in real time can be compensated for to enable the wireless link to maintain maximum signal strength under active conditions of a wireless link.

Accordingly, an apparatus includes a TV chassis, a TV display supported on the chassis, and a TV tuner receiving video signals. The apparatus also includes a TV processor communicating with the tuner and display to cause the video signals from the tuner to be presented on the display. A wireless data receiver receives wireless video signals from a network and a reflector assembly is positioned to redirect, to the wireless data receiver, wireless video signals that otherwise would be at least partially blocked from the wireless data receiver by the chassis.

In example embodiments the reflector assembly is supported on the chassis in line of sight with the wireless data receiver. The wireless data receiver may not communicate with the TV tuner.

In examples discussed further below the reflector assembly can be movable on the chassis. In specific examples a control processor controls position of the reflector assembly to establish a signal strength at the receiver at least to satisfy a threshold. The control processor may be established the TV processor and/or by a processor associated with the wireless data receiver. If desired, the reflector assembly can be established by a microelectromechanical systems (MEMS) assembly comprising at least a digital micromirror device (DMD).

In another aspect, a device includes a video display, an antenna receiving directional wireless signals, and a processor receiving the signals for presentation on the display. A mirror assembly reflects the signals toward the antenna.

In another aspect, a system is disclosed in which a TV receives video over a directional wireless 60 GHz link. A mirror apparatus is provided that can be configured to physically steer a signal toward a receiver on the TV to optimize received signal strength, so that RF energy that otherwise would be radiated in non-productive directions away from the receiver instead is reflected toward the receiver.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a perspective view of the front of a wall-mounted flat panel TV, showing network components schematically;

FIG. 2 is a block diagram showing components of an example TV;

DETAILED DESCRIPTION OF THE PREFERRED EMBODIMENT

Figure 3:
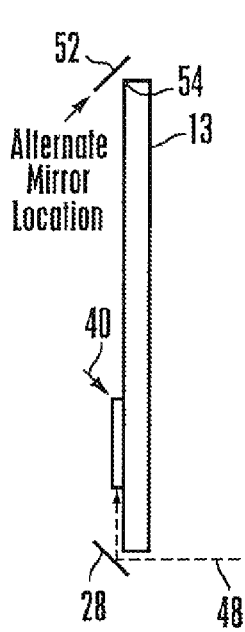
FIGS. 3 and 4 are schematic side and read views, respectively, of an example implementation.

Referring initially to FIG. 1, a home network 10 may include one more TVs 12 (only a single TV shown) with a TV chassis 13, in some cases made of metal, holding a TV display 14. Typically, a plastic frame-like bezel 15 frames the display 14.

A TV 12 may be mounted by means known in the art on a surface 16 of a dwelling, such as a wall or ceiling. The TV 12 may be an analog and/or digital TV with a flat panel (matrix-type) standard definition and/or high definition (HD) display 14, although other types of displays may be used.

The network 10 may include various components that communicate audio-video information wirelessly to the TV 12 using, e.g., 60 GHz wireless transmission principles, although other wireless principles may be used. For example, the TV 12 may receive compressed or uncompressed HD video from a computer server 18, a disk player 20, a personal video recorder (PVR) 22, and a personal computer (PC) 24, as well as other information such as digital photographs for display on the TV 12, on 60 GHz wireless links. Other network components such as game players or indeed other TVs may be provided in the network 10. A hand-held remote control device 26 may be manipulated by a person to input wireless command signals to the TV 12 and/or to various network components in accordance with principles known in the art.

FIG. 1 shows that one or more mirror assemblies 28 (only one assembly 28 shown for clarity) each of which can include one or movable reflectors such as mirrors can be mounted on the chassis 13 to reflect RF energy from one or more wireless links 30 to the below-described RF receiver on the rear of the TV. To this end, the mirror assembly 28 is in line-of-sight with the RF receiver. The wireless links 30 typically are directional short-range wireless links, e.g., 60 GHz links that carry high bandwidth audio/video signals for display on the TV.

In addition or in lieu of the TV-mounted mirror assembly 28, one or more component mirror assemblies 32 may be provided on one or more of the components 18-24 (only the PC 24 shown as having a mirror assembly 32 in FIG. 1). The mirror assemblies 28, 32 may be substantially identical to each other in configuration and may be controlled in concert or individually to optimize received signal strength at the RF receiver described further below of signals from any one or more of the components 18-24. In any case, a mirror assembly 28, 32 may be as simple as a single movable conventional mirror or it may be implemented by a microelectromechanical systems (MEMS) assembly that includes a digital micromirror device (DMD). A non-limiting example of such a device may be available from Texas Instruments and an example is discussed in U.S. Pat. No. 5,142,405, incorporated herein by reference.

Now referring to FIG. 2, the TV 12 includes a TV processor 34 controlling the TV display 14. The TV processor 34 communicates with a TV tuner 36 receiving TV signals from a TV source such as a cable head end, satellite receiver, terrestrial antenna, etc., it being understood that the TV tuner 36 may be incorporated in the TV chassis 13 or in a set-top box, etc. The TV processor 34 also typically accesses a computer readable storage medium 38 that bears computer instructions executable by the processor 34 and that may store data. The medium 38 may be implemented, without limitation, by disk-based or solid-state storage.

The TV processor 34 may also communicate with an RF receiver assembly 40 that may be mounted on the chassis 13, e.g., on the rear surface of the chassis 13. The assembly 40 may include one or more RF antennas 42 sending signals to an RF receiver 44, which in turn may be controlled by an RF processor or controller 46. The RF components 42-46 may be included in a single physical package or may be in separate packages and separately mounted on the chassis 13. In one example embodiment the RF receiver assembly 40 is a 60 GHz receiver assembly that receives and processes wireless audio/video signals in the 60 GHz band and sends the signals to the TV processor 34 for presentation on the TV display 14. In some embodiments the functions of the processors 34, 46 may be implemented in a single processor.

Figure 4:
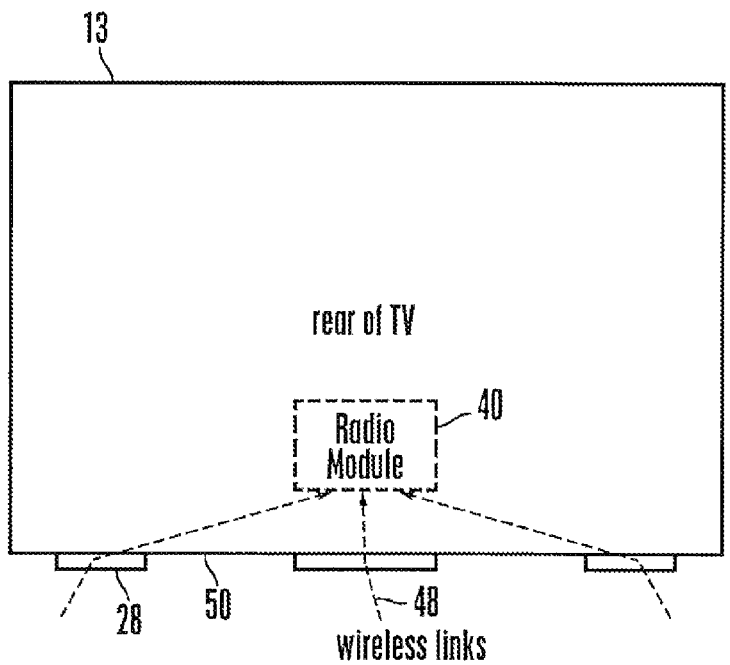

FIGS. 3 and 4 illustrate the cooperation of structure between the mirror assembly 28 (FIG. 4 shows three such assemblies) and the RF receiver module 40. As indicated by the wireless link lines 48, RF energy from one of the components 18-24 shown in FIG. 1 is reflected by the mirror assemblies 28 directly toward the RF receiver module 40, it being understood that when the antenna 42 is mounted separately the mirror assemblies 28 are controlled to reflect the RF energy to the antenna 42. In the non-limiting example shown in FIGS. 3 and 4 the mirror assemblies are mounted along the bottom rear edge 50 of the TV chassis 13 substantially in line of sight with the receiver assembly 40. As an alternative, FIG. 3 shows at 52 that one or more mirror assemblies may be mounted along the top rear edge 54 of the TV chassis 13.

Figure 5:
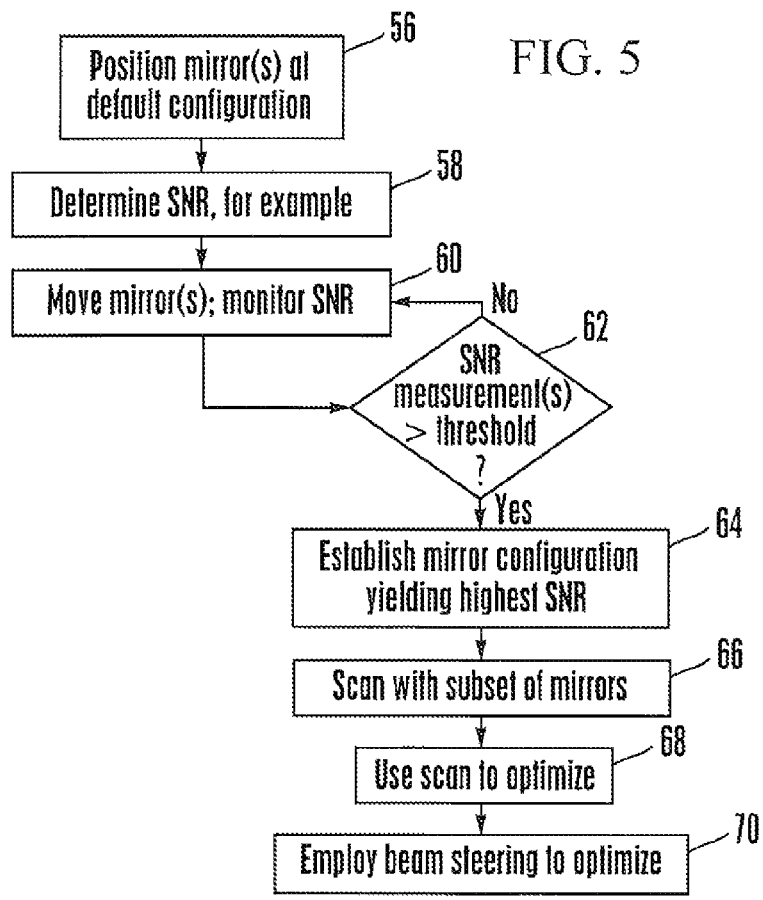
FIG. 5 is a flow chart of example logic that may be used.

In example embodiments the mirror assemblies may be controlled by the RF processor 46 and/or TV processor 34 to optimize received RF signal strength. FIG. 5 illustrates that initializing at state 56 and assuming a single mirror assembly 28 for convenience, the mirror assembly 28 is positioned at a default configuration, e.g., one in which the assembly 28 reflects RF energy impinging on the assembly 28 from a path directly normal to the front the display 14 toward the geometric center of the rear surface of the TV chassis 13.

Moving to block 58, one or more indicia of adequate signal are determined. For example, signal strength at the RF receiver may be determined. Alternatively or in addition, an error rate may be determined. For ease of disclosure it will be assumed that only signal strength, and more particularly signal-to-noise ratio (SNR) is determined.

The mirror assembly 28 is moved at block 60 incrementally and then SNR determined again. For example, when DMD principles are used a very diffused "aim" initially may be implemented with each micro mirror facing a different direction than the other micro mirrors, and then the micro mirrors progressively assuming the "best" angle in for optimum pickup.

Decision diamond 62 indicates that if desired, for system stability purposes it may be determined whether the current SNR satisfies a predetermined threshold and if so the current mirror assembly 28 configuration is fixed at block 64. If SNR does not satisfy the threshold, however, another mirror assembly 28 is tried at block 60 and SNR re-calculated and tested at decision diamond 62.

In some embodiments, if desired the logic may proceed to block 66 to scan other mirror positions with a subset of the mirrors provided in the mirror assembly 28 (when the mirror assembly 28 contains multiple mirrors). For example, one or a few mirrors, which may be thought of as "scout" mirrors, may be independently moved to determine if SNR rises and if so, the remainder of the mirrors in the assembly 28 can be re-positioned accordingly. In this way, at block 68 SNR may be continually optimized using the scan results. As well, obstructions that may be moved in between the TV and the components 18-24 may be accounted for by dynamically reconfiguring the mirror assembly 28.

If desired, the indicia of adequate signal may be exchanged over a wired or wireless backchannel that may have a lower bandwidth than the main channel between the transmitter and receiver over which the video is sent. The backchannel preferably is less directional than the main channel and may operate at a different frequency than the main channel. The backchannel may be implemented by, e.g., Bluetooth, although other transmission protocols for sending the indicia of adequate signal strength may be used. The lower bandwidth backchannel can be particularly advantageous when both the transmitter and receiver have steerable mirrors whose positioning must be established in concert with each other.

If further desired, at block 70 beam steering may be employed using the RF antenna 42 (particularly when an array of RF antennas 42 is provided) in addition to the above-described reflective steering to further enhance the received signal. In effect, the minor assembly 28 can be used as a coarse SNR optimization and then conventional RF beam steering can be implemented to refine SNR.

The minor assembly 28 can also permit gathering the signal into a wave guide for delivery to the antenna/transducer located behind the TV chassis. If desired the mirror assembly 28 can be oriented in two directions at once, similar to multiple-input-multiple output (MIMO) principles except with only one transmitting component and only one receiver module, with the multiple paths being created by the minors.

While the particular STEERING MIRROR FOR TV RECEIVING HIGH FREQUENCY WIRELESS VIDEO is herein shown and described in detail, it is to be understood that the subject matter which is encompassed by the present invention is limited only by the claims.

What is claimed is:

1. Apparatus comprising:
TV chassis;
TV display supported on the chassis;
TV tuner receiving video signals;
TV processor communicating with the tuner and display to cause the video signals from the tuner to be presented on the display;
wireless data receiver receiving wireless video signals from a network; and
reflector assembly positioned to redirect, to the wireless data receiver, wireless video signals that otherwise would be at least partially blocked from the wireless data receiver by the chassis, wherein the reflector assembly is movable on the chassis, wherein a control processor controls position of the reflector assembly, wherein the control processor controls position of the reflector assembly to establish an index of adequate signal at the receiver at least to satisfy a threshold, the index of adequate signal being communicated on a backchannel different than a main channel over which the wireless video signals are transmitted.

2. Apparatus of claim 1, wherein the reflector assembly is supported on the chassis in line of sight with the wireless data receiver.

3. Apparatus of claim 1, wherein the wireless data receiver does not communicate with the TV tuner.

4. Apparatus of claim 1, wherein the control processor is established by one or more of the TV processor, and a processor associated with the wireless data receiver on a transmitter sending information to the TV.

5. Apparatus of claim 1, wherein the reflector assembly is established by a microelectromechanical systems (MEMS) assembly comprising at least a digital micromirror device (DMD).

6. Device, comprising:
video display supported by a chassis;
antenna receiving directional wireless signals;
processor receiving the signals for presentation on the display; and
mirror assembly on the chassis and reflecting the signals toward the antenna, the mirror assembly being steerable on the chassis to establish a reception metric to at least satisfy a threshold metric.

7. The device of claim 6, further comprising:
a TV tuner receiving video signals;
a TV processor communicating with the tuner and display to cause the video signals from the tuner to be presented on the display; and
the antenna being implemented in a wireless data receiver receiving the directional wireless signals from a component.

8. The device of claim 7, wherein the mirror assembly is supported on the chassis in line of sight with the wireless data receiver.

9. The device of claim 6, wherein a control processor controls position of the mirror assembly.

10. The device of claim 9, wherein the control processor controls position of the mirror assembly to establish an index of adequate signal at the receiver at least to satisfy a threshold.

11. The device of claim 9, wherein the control processor is established by one or more of a TV processor, and a processor associated with the antenna.

12. The device of claim 6, wherein the mirror assembly is established by a digital micromirror device (DMD).

* * * * *